US011551280B2

(12) United States Patent
Steck (10) Patent No.: US 11,551,280 B2
(45) Date of Patent: Jan. 10, 2023

(54) METHOD, MANUFACTURE, AND SYSTEM FOR RECOMMENDING ITEMS TO USERS

(71) Applicant: NETFLIX, INC., Los Gatos, CA (US)

(72) Inventor: Harald Steck, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 51 days.

(21) Appl. No.: 16/664,761

(22) Filed: Oct. 25, 2019

(65) Prior Publication Data

US 2020/0143448 A1     May 7, 2020

Related U.S. Application Data

(60) Provisional application No. 62/754,536, filed on Nov. 1, 2018.

(51) Int. Cl.
*G06Q 30/00* (2012.01)
*G06Q 30/06* (2012.01)
*G06N 20/00* (2019.01)

(52) U.S. Cl.
CPC ......... *G06Q 30/0631* (2013.01); *G06N 20/00* (2019.01); *G06Q 30/0633* (2013.01); *G06Q 30/0643* (2013.01)

(58) Field of Classification Search
CPC ..... G06Q 30/0601–0645; G06Q 30/08; G06N 20/00
USPC ............................................... 705/26.1–27.2
See application file for complete search history.

(56) References Cited

U.S. PATENT DOCUMENTS

| | | | |
|---|---|---|---|
| 8,983,888 B2* | 3/2015 | Nice | G06N 5/02 706/45 |
| 10,558,913 B1* | 2/2020 | Turner | G06N 3/08 |
| 11,080,596 B1* | 8/2021 | Makhijani | G06N 5/04 |
| 2003/0078683 A1* | 4/2003 | Hartman | G06Q 10/04 700/44 |

(Continued)

OTHER PUBLICATIONS

Kang et al., Top-N Recommender System via Matrix Completion, 2016, Proceedings of the Thirtieth AAAI Conference on Artificial Intelligence (AAAI-16), accessed at [https://www.aaai.org/ocs/index.php/AAAI/AAAI16/paper/download/11824/11581] (Year: 2016).*

(Continued)

*Primary Examiner* — Jeffrey A. Smith
*Assistant Examiner* — Lindsey B Smith
(74) *Attorney, Agent, or Firm* — Artegis Law Group, LLP (57) ABSTRACT

In various embodiments, a training application generates a preference prediction model based on an interaction matrix and a closed-form solution for minimizing a Lagrangian. The interaction matrix reflects interactions between users and items, and the Lagrangian is formed based on a constrained optimization problem associated with the interaction matrix. A service application generates a first application interface that is to be presented to the user. The service application computes predicted score(s) using the preference prediction model, where each predicted score predicts a preference of the user for a different item. The service application then determines a first item from the items to present to the user via an interface element included in the application interface. Subsequently, the service application causes a representation of the first item to be displayed via the interface element included in the application interface.

20 Claims, 4 Drawing Sheets

(56) References Cited

U.S. PATENT DOCUMENTS

| | | | | |
|---|---|---|---|---|
| 2009/0006373 | A1* | 1/2009 | Chakrabarti | G06F 16/335 |
| 2013/0290110 | A1* | 10/2013 | LuVogt | G06F 16/9535 |
| | | | | 705/14.66 |
| 2019/0098039 | A1* | 3/2019 | Gates | G06N 7/005 |
| 2019/0205762 | A1* | 7/2019 | Sher | G06F 16/1794 |
| 2019/0370881 | A1* | 12/2019 | Davis | G06Q 30/0631 |

OTHER PUBLICATIONS

International Search Report for application No. PCT/US2019/058742 dated Feb. 19, 2020.
Kang et al., "Top-N Recommendation with Novel Rank Approximation", arXiv:1602.07783v2, Feb. 25, 2016, 9 pages.
Ning et al., "SLIM: Sparse Linear Methods for Top-N Recommender Systems", Data Mining (ICDM), 2011 IEEE 11th International Conference on, IEEE, DOI: 10.1109/ICDM.2011.1341, Dec. 11, 2011, pp. 497-506.
Cheng et al., "LorSLIM: Low Rank Sparse Linear Methods for Top-N Recommendations", 2014 IEEE International Conference on Data Mining, DOI:10.1109/ICDM.2014.112, ISBN: 978-1-4799-4303-6, Dec. 1, 2014, pp. 90-99.
Wang et al., "Local Top-N Recommendation via Refined Item-User Bi-Clustering", 12th European Conference on Computer Vision , ECCV 2012, DOI: 10.1007/978-3-319-68786-5_29, 2017, pp. 357-371.
Steck, Harald, "Collaborative Filtering via High-Dimensional Regression", arXiv:1904.13033v1, Apr. 30, 2019, pp. 1-10.
Steck, Harald, "Embarrassingly Shallow Autoencoders for Sparse Data", DOI: 10.1145/3308558.3313710, ISBN: 978-1-4503-6674-8, May 13, 2019, pp. 3251-3257.
Aiolli, Fabio, "Efficient Top-N Recommendation for Very Large Scale Binary Rated Datasets", in ACM Conference on Recommender Systems (ReeSys), http://dx.doi.org/10.1145/2507157.2507189, Oct. 12-16, 2013, pp. 273-280.
Bennett et al., "The Netflix Prize", in Workshop at SIGKDD-07, ACM Conference on Knowledge Discovery and Data Mining, Aug. 12, 2007, 4 pages.
Bertin-Mahieux et al., "The Million Song Dataset", in International Society for Music Information Retrieval Conference (ISMIR), 2011, 6 pages.
Harper et al., "The MovieLens Datasets: History and Context", ACM Transactions on Interactive Intelligent Systems (TiiS), DOI: http://dx.doi.org/10.1145/2827872, vol. 5, No. 4, Article 19, Dec. 2015, pp. 19:1-19:19.
He et al., "Neural Collaborative Filtering", in International World Wide Web Conference (WWW), http://dx.doi.org/10.1145/3038912.3052569, Apr. 3-7, 2017, pp. 173-182.
Hidasi et al., "Recurrent Neural Networks with Top-k Gains for Session-based Recommendations", arXiv:1706.03847, https://doi.org/10.1145/3269206.3271761, Oct. 22-26, 2018, 10 pages.
Hidasi et al., "Session-Based Recommendations With Recurrent Neural Networks", arXiv:1511.06939, ICLR, 2016, pp. 1-10.
Hu et al., "Collaborative Filtering for Implicit Feedback Datasets", in IEEE International Conference on Data Mining (ICDM), DOI 10.1109/ICDM.2008.22, 2008, pp. 263-272.
Levy et al., "Efficient Top-N Recommendation by Linear Regression", in ReeSys Large Scale Recommender Systems Workshop, https://www.slideshare.net/MarkLevy/efficient-slides, 2013, 23 pages.
Liang et al., "Variational Autoencoders for Collaborative Filtering", in ACM Conference on Web Search and Data Wining (WSDM), https://doi.org/10.1145/3178876.3186150, Apr. 23-27, 2018, 10 pages.
McFee et al., "The Million Song Dataset Challenge", in International World Wide Web Conference (WWW), http://www.kaggle.com/c/msdchallenge, Apr. 16-20, 2012, pp. 909-916.
Ning et al., "SLIM: Sparse Linear Methods for Top-N Recommender Systems", in IEEE International Conference on Data Mining (ICDM), DOI 10.1109/ICDM.2011.134, 2011, pp. 497-506.
Ning et al., "Sparse Linear Methods with Side Information for Top-N Recommendations", in ACM Conference on Recommender Systems (ReeSys), 2012, 8 pages.
Pan et al., "One-Class Collaborative Filtering", in IEEE International Conference on Data Mining (ICDM), DOI 10.1109/ICDM.2008.16, 2008, pp. 502-511.
Schmidt, Mark, "Graphical Model Structure Learning with L1-Regularization", Ph.D. Dissertation, University of British Columbia, Aug. 2010, 175 pages.
Sedhain et al., "On the Effectiveness of Linear Models for One-Class Collaborative Filtering", Proceedings of the Thirtieth AAAI Conference on Artificial Intelligence, AAAI-16, 2016, pp. 229-235.
Sedhain et al., "Autorec: Autoencoders meet Collaborative Filtering", in International World Wide Web Conference (WWW), http://dx.doi.org/10.1145/2740908.2742726, May 18-22, 2015, 2 pages.
Verstrepen et al., "Unifying Nearest Neighbors Collaborative Filtering", in ACM Conference on Recommender Systems (RecSys), http://dx.doi.org/10.1145/2645710.2645731, Oct. 6-10, 2014, pp. 177-184.
Volkovs et al., "Effective Latent Models for Binary Feedback in Recommender Systems", in ACM Conference on Research and Development in Information Retrieval (SIGIR), DOI: http://dx.doi.org/10.1145/2766462.2767716, Aug. 9-13, 2015, 10 pages.
Wu et al., "Collaborative Denoising Auto-Encoders for Top-N Recommender Systems", in ACM Conference on Web Search and Data Mining (WSDM), DOI: http://dx.doi.org/10.1145/2835776.2835837, Feb. 22-25, 2016, 10 pages.
Zheng et al., "A Neural Autoregressive Approach to Collaborative Filtering", in International Conference on Machine Learning (ICML), arXiv:1605.09477, 2016, 10 pages.

* cited by examiner

METHOD, MANUFACTURE, AND SYSTEM FOR RECOMMENDING ITEMS TO USERS

CROSS-REFERENCE TO RELATED APPLICATIONS

This application claims priority benefit of the United States Provisional Patent Application titled, "SHALLOW ENCODERS FOR SPARSE DATA," filed on Nov. 1, 2018 and having Ser. No. 62/754,536. The subject matter of this related application is hereby incorporated herein by reference.

BACKGROUND

Field of the Various Embodiments

Embodiments relate generally to computer science and recommendation systems and, more specifically, to techniques for recommending items to users.

Description of the Related Art

Recommendation systems are designed to predict and display items that are most likely to be of interest to users. These types of systems are used in many different contexts. For instance, recommendation systems are used by media services to help users decide which media items in a media catalog to watch. Recommendation systems also are used by on-line retailers to suggest various items to users to entice the users to purchase those items. Many recommendation systems generate recommendations using collaborative filtering recommendation models that predict the preferences of users for items based on the historical preferences of those users and/or other users for the same and/or similar items. In some recommendation systems, each historical preference is a Boolean that indicates whether a user has interacted with (e.g., purchased, viewed, etc.) an item. In other recommendation systems, each historical preference is a value within a range, such as a rating provided by a user for a specific item.

One common type of collaborative filtering recommendation model is a recommender deep neural network that is trained to recognize and interpret preference patterns in historical preferences in order to compute predicted preferences. A recommender deep neural network is a non-linear model in which interconnected parameterizable units known as "neurons" are arranged sequentially into an input layer, at least one hidden layer, and an output layer. Training a recommender deep neural network is typically an iterative process, where, after each training iteration, parameters (e.g., weights and biases) for the various neurons in the neural network are automatically adjusted based on differences between the predicted preferences and the historical preferences. In general, the accuracy of a recommender deep neural network typically correlates to the number of parameters within the neural network, the number of historical preferences used to train the neural network, and the number of training iterations.

One drawback of using recommender deep neural networks for recommendation systems is that the amount of time and/or the amount of processing resources required to train a recommender deep neural network to the required level of accuracy can be somewhat prohibitive. For example, a typical recommender deep neural network could include millions or even billions of parameters, and the historical data could represent millions or even more than a billion users. As a result, thousands or tens-of-thousands of iterations could be required to train the neural network to achieve the required level of accuracy, thus requiring numerous processor hours to train the recommender deep neural network. Furthermore, new user preferences may be established as users interact with the items recommended via a recommender deep neural network, which can degrade the accuracy of the recommender deep neural network unless the neural network is retrained to account for those new preferences.

Another drawback of using recommender deep neural networks for recommendation systems is that, because a recommender deep neural network is a complex, non-linear model for which the parameters are automatically adjusted during training, understanding what a recommender deep neural network actually learned during training can be difficult. Such an understanding is important, for example and without limitation, to improving the accuracy of the recommender deep neural network (e.g., when debugging the neural network) and to understanding and providing the reasons why a particular recommendation was generated for a user.

As the foregoing illustrates, what is needed in the art are more effective techniques for generating user recommendations.

SUMMARY

One embodiment sets forth a computer-implemented method for generating user recommendations. The method includes generating a preference prediction model based on a first matrix and a closed-form solution for minimizing a Lagrangian, where the first matrix is associated with an interaction matrix that reflects a plurality of interactions between a plurality of users and a plurality of items, and where the Lagrangian is formed based on a constrained optimization problem associated with the interaction matrix; generating a first application interface that is to be presented to a first user included in the plurality of users, where the first application interface includes a plurality of interface elements, and each interface element is individually selectable when the first application interface is displayed and is associated with a different item included in the plurality of items; computing one or more predicted scores using the preference prediction model, where each predicted score predicts a preference of the first user for a different item included in the plurality of items; determining a first item from the plurality of items to present to the first user via a first interface element included within the first application interface based on the one or more predicted scores; and causing a representation of the first item to be displayed via the first interface element included in the first application interface.

At least one technical advantage of the disclosed techniques relative to the prior art is that the disclosed techniques can be used to more efficiently generate models that accurately predict the preferences of users. In particular, because the disclosed techniques can be used to train a preference prediction model non-iteratively using a computationally-efficient closed-form solution, the time and processing resources required for training can be reduced relative to the iterative processes typically employed when training deep neural networks. Another advantage of the disclosed techniques is that, because the preference prediction model is a linear regression model, understanding what the preference prediction model learned during training is simpler. Yet another advantage of the disclosed techniques is that a full set of weights is determined; whereas, in prior art approaches involving neural networks, some weight-related information can be lost, leading to potential inaccuracies in the predictions generated by the neural networks. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

A typical media services uses a recommendation system to help users decide which media items in a media catalog to watch. In general, a recommendation system predicts items that are most likely to be of interest to users based on a recommendation model that predicts preferences of users for items. For example, a recommendation system could compute predicted ratings of Mary for media items in a media catalog using a recommendation model. Subsequently, the recommendation system could rank the media items that Mary has not yet rated by the predicted ratings to determine the twenty media items that are most likely to be of interest to Mary. One common type of recommendation model is a recommender deep neural network that is trained to recognize and interpret preference patterns in historical preferences (e.g., ratings, viewing history, etc.) between media items and users in order to compute predicted preferences. Training a recommender deep neural network is typically an iterative process, where, after each training iteration, parameters are automatically adjusted based on differences between the predicted preferences and the historical preferences.

One drawback of using recommender deep neural networks for recommendation systems is that the amount of time and/or the amount of processing resources required to train a recommender deep neural network to the required level of accuracy can be somewhat prohibitive. Furthermore, new user preferences may be established as users interact with the items recommended via a recommender deep neural network, which can degrade the accuracy of the recommender deep neural network unless the neural network is retrained to account for those new preferences.

Another drawback of using recommender deep neural networks for recommendation systems is that, because a recommender deep neural network is a complex, non-linear model for which the parameters are automatically adjusted during training, understanding what a recommender deep neural network actually learned during training can be difficult.

With the disclosed techniques, however, a preference prediction model is trained to predict preferences of users for items as a linear combination of weights in a weight matrix that has the dimensions of N by N, where N is the total number of items. In operation, a training application implements a closed-form solution for learning a non-identity weight matrix that configures the preference prediction model to replicate an input of historical preferences for a user as an output of predicted preferences for the user. A closed-form solution is a mathematical expression that can be evaluated using a finite number of operations, and the training application computes the closed-form solution a single time to train the preference prediction model. Subsequently, a service application receives an interaction request from a user and, in response, computes predicted preferences for the user for the media items using the historical preferences for the user and the preference prediction model. The service application ranks the media items that the user has not previously viewed based on the predicted preferences. The service application then displays thumbnails representing the highest ranked media items to the user via an application interface.

At least one technical advantage of the disclosed techniques relative to the prior art is that the disclosed techniques can be used to more efficiently train models that accurately predict the preferences of users. In particular, because the training application trains the preference prediction model non-iteratively using a computationally-efficient closed-form solution, the time and processing resources required for training can be reduced relative to the iterative processes typically employed when training deep neural networks. Another advantage of the disclosed techniques is that the preference prediction model is a linear regression model and various techniques for understanding the learned parameters in linear regression models exist. Consequently, understanding what the preference prediction model learned during training is simpler. These technical advantages provide one or more technological advancements over prior art approaches.

System Overview

Figure 1:
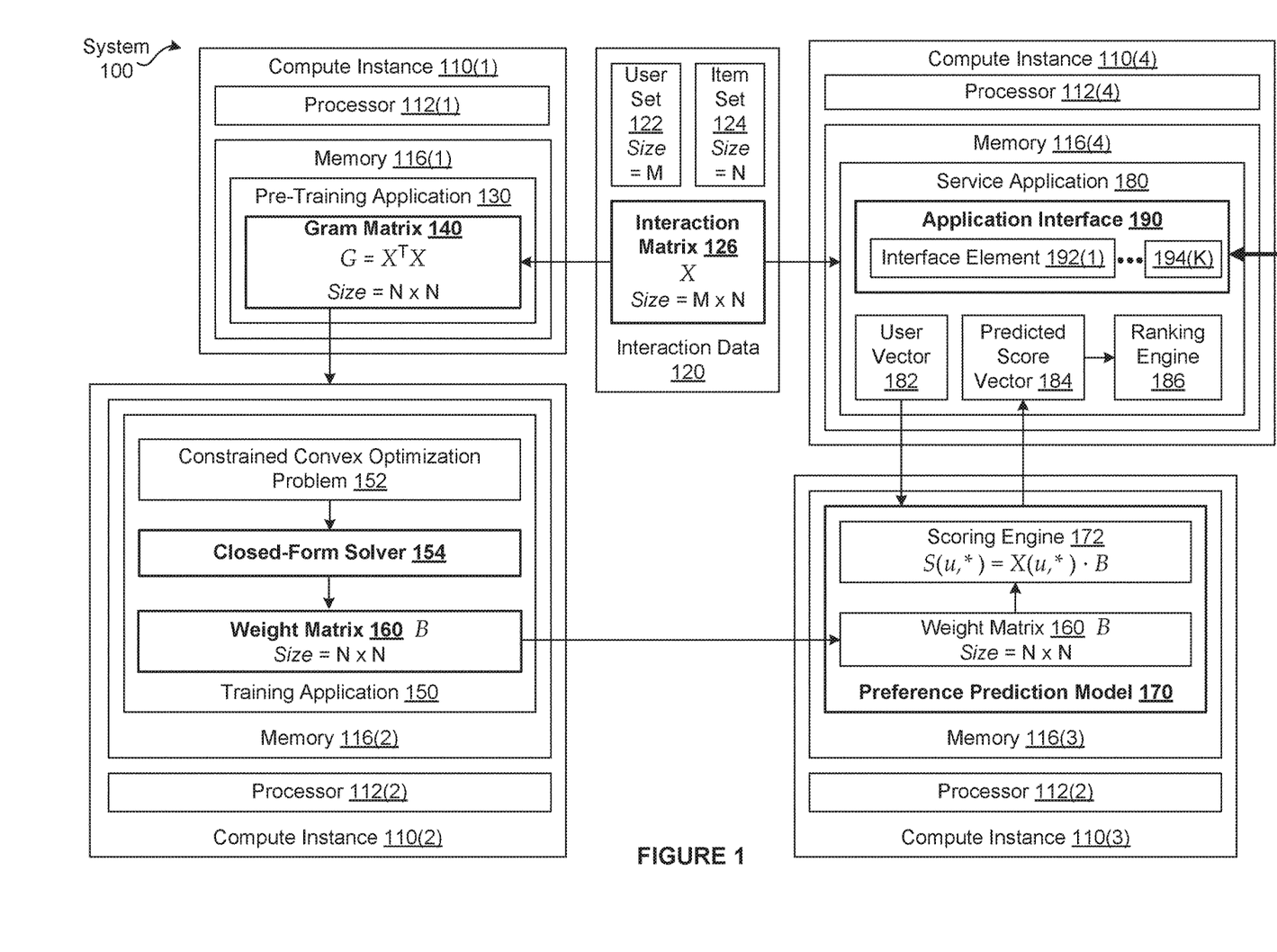
FIG. 1 is a conceptual illustration of a system configured to implement one or more aspects of the various embodiments.

FIG. 1 is a conceptual illustration of a system 100 configured to implement one or more aspects of the various embodiments. The system 100 includes, without limitation, any number of compute instances 110 and interaction data 120. For explanatory purposes, multiple instances of like objects are denoted with reference numbers identifying the object and parenthetical numbers identifying the instance where needed.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each of the compute instances 110 is configured to implement one or more applications or subsystems of applications. For explanatory purposes only, each application is depicted as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instances 110 are configured to implement a recommendation system that recommends items that are most likely to be of interest to users using a preference prediction model 170. The preference prediction model 170 is a collaborative filtering recommendation model that computes predicted scores of users for items based on an interaction matrix 126 that represents historical preferences of the users for the items. Each predicted score represents a predicted preference of a user for an item.

As described previously herein, a common type of collaborative filtering recommendation model is a recommender deep neural network that is trained based on historical preferences of users for items. One drawback of using recommender deep neural networks for recommendation systems is that the amount of time and/or the amount of processing resources required to train a recommender deep neural network to the required level of accuracy can be somewhat prohibitive. Another drawback of using recommender deep neural networks for recommendation systems is that, because a recommender deep neural network is a complex, non-linear model for which the parameters are automatically adjusted during training, understanding what a recommender deep neural network actually learned during training can be difficult. Such an understanding is important, for example and without limitation, to improving the accuracy of the recommender deep neural network (e.g., when debugging the neural network) and to understanding and providing the reasons why a particular recommendation was generated for a user.

Linear Preference Prediction Model

To address the above problems, the compute instance 110(2) implements a training application 150 that executes a single linear regression to train the preference prediction model 170 based on the interaction data 120. The preference prediction model 170 is a linear model that, after training, generates a predicted score of a user for an item based a weighted aggregation of the historical preferences of the user for other items. The predicted score predicts a degree of preference of the user for the item. A degree of preference is also referred to herein as a preference.

As shown, the interaction data 120 includes, without limitation, a user set 122, an item set 124, and an interaction matrix 126. The user set 122 includes, without limitation, M users and the item set 124 includes, without limitation, N items, where M and N are positive integers. Each of the users and each of the items may be identified in any technically feasible fashion. The interaction matrix 126 has a different row for each of the users included in the user set 122 and a different column for each of the items included in the item set 124. Consequently, the interaction matrix 126 is a user-item matrix that has the dimensions of M by N and includes, without limitation, M by N entries.

The interaction matrix 126 is denoted as X, the entry in the row u and the column j of the interaction matrix 126 is denoted as $X(u,j)$, the row u of the interaction matrix 126 is denoted as $X(u,*)$, and the column j of the interaction matrix 126 is denoted as $X(*,j)$. The entries in the $u^{th}$ row of the interaction matrix 126 correspond to the $u^{th}$ user in the user set 122 and represent ground-truth scores of the $u^{th}$ user for each of the items in the item set 124. If the $u^{th}$ user has interacted with the $j^{th}$ item, then $X(u,j)$ is positive. Otherwise, $X(u,j)$ is zero.

The interaction data 120 may be generated in any technically feasible fashion. For instance, in some embodiments, each item in the item set 124 is an item on a retail website, the interaction matrix 126 is a binary matrix, $X(u,j)$ is one when the $u^{th}$ user has purchased the $j^{th}$ item, and $X(u,j)$ is zero when the $u^{th}$ user has not purchased the $j^{th}$ item. In other embodiments, each item in the item set 124 is a movie, $X(u,j)$ is a score when the $u^{th}$ user has rated the $j^{th}$ movie, and $X(u,j)$ is zero when the $u^{th}$ user has not rated the $j^{th}$ movie In various embodiments, each item in the item set 124 is a movie, $X(u,j)$ is a viewing time when the $u^{th}$ user has watched at least a portion of the $j^{th}$ movie, and $X(u,j)$ is zero when the $u^{th}$ user has not watched any portion of the $j^{th}$ movie.

To initiate the training of the preference prediction model 170, a pre-training application 130 generates a Gram matrix 140 based on the interaction matrix 126. As shown, the pre-training application 130 resides in the memory 116(1) of the compute instance 110(1) and executes on the processor 112(1) of the compute instance 110(1). In some embodiments, because computing the Gram matrix 140 can be computationally-intensive, the compute instance 110(1) is a big-data pre-processing system.

The Gram matrix 140 is denoted as G, and the entry in the row i and the column j of the Gram matrix 140 is denoted as $G(i,j)$. In some embodiments, the Gram matrix 140 is equal to the interaction matrix 126 pre-multiplied by the transpose of the interaction matrix 126 and can therefore be expressed as the following equation (1):

$$G = X^T X \quad (1)$$

The Gram matrix 140 is an item-item matrix that has the dimensions of N by N and includes, without limitation, $N^2$ entries. As exemplified in conjunction with FIG. 2, in many recommendation systems, the number of users M is significantly greater than the number of items N. Consequently, the total number of entries in the Gram matrix 140 may be significantly less than the total number of entries in the interaction matrix 126. The pre-training application 130 may compute the Gram matrix 140 in any technically feasible fashion. In alternate embodiments, the pre-training application 130 may transform the interaction matrix 126 into any type of Gram matrix 140 using any definition (e.g., equation) for the Gram matrix 140.

Subsequently, the training application 150 generates a weight matrix 160 based on the Gram matrix 140. Notably, the training application 150 neither receives nor directly uses the interaction matrix 126. The training application 150 resides in the memory 116(2) of the compute instance 110(2) and executes on the processor 112(2) of the compute instance 110(2). In operation, the training application 150 executes a single linear regression to generate the weight matrix 160. The dimensions of the weight matrix 160 match the dimensions of the Gram matrix 150. Therefore, the weight matrix 160 has the dimensions of N×N and includes, without limitation, $N^2$ entries.

Each entry in the weight matrix 160 is also referred to herein as a weight and is a parameter of the preference prediction model 170. The weight matrix 160 is denoted as B, the $i^{th}$ row of the weight matrix 160 is denoted as $B(i,*)$, the $j^{th}$ column of the weight matrix 160 is denoted as $B(*,j)$, and the weight in the $i^{th}$ row and the $j^{th}$ column of the weight matrix 160 is denoted as $B(i,j)$. The weights included in the weight matrix 160 are the parameters of the preference prediction model 170. Accordingly, generating the weight matrix 160 is also referred to herein as training the preference prediction model 170.

As shown, the training application 150 includes, without limitation, a constrained convex optimization problem 152, a closed-form solver 154, and the weight matrix 160. The constrained convex optimization problem 152 is based on an overall objective of training the preference prediction model 170 to reproduce the input as the output. In some embodiments, the input to the preference prediction model 170 is a user vector 182 and the output of the preference prediction model 170 is a predicted score vector 184. The user vector 182 is a row of the interaction matrix 126 corresponding to one of the users included in the user set 122. The predicted score vector 184 includes, without limitation, N predicted scores, where each score corresponds to a different item included in the item set 124. Accordingly, when the user vector 182 $X(u,*)$ that corresponds to the user u is inputted into the preference prediction model 170, the preference prediction model 170 computes and outputs the predicted score vector 184, denoted as $S(u,*)$, that includes N predicted scores for the user u.

In the same or other embodiments, the entire interaction matrix 140 X is inputted into the preference prediction model 170 and, in response, the preference prediction model 170 outputs a predicted score matrix (not shown). The predicted score matrix is denoted as S, has the dimensions of M by N, and includes, without limitation, M×N predicted scores. In the same or other embodiments, the user vector 182 $X(u,*)$ and an item identifier j are inputted into the preference prediction model 170 and, in response, the preference prediction model 170 computes and outputs a single predicted score that is denoted as $S(u,j)$. The predicted score $S(u,j)$ represents a predicted preference of the $u^{th}$ user in the user set 122 for the $j^{th}$ item in the item set 124. In general, the preference prediction model 170 can be expressed as one or more of the following equations (2a), (2b), or (2c):

$$S = XB \quad (2a)$$

$$S(u,*) = X(u,*) \cdot B \quad (2b)$$

$$S(u,j) = X(u,*) \cdot B(*,j) \quad (2c)$$

To avoid overfitting the preference prediction model 170, the constrained convex optimization problem 152 includes regularization of the weights to be learned. And to ensure that the preference prediction model 170 learns to generalize instead of learning the trivial solution of the identity matrix, the constrained convex optimization problem 152 includes a self-similarity prevention constraint (not shown in FIG. 1). The self-similarity prevention constraint constrains the entries along the diagonal of the weight matrix 160, denoted as $B(j,j)$, to zero. More generally, the self-similarity prevention constraint ensures that the entry $X(u,j)$ of the interaction matrix 140 is not used to compute the predicted score $S(u,j)$.

Accordingly, a convex objective (not shown in FIG. 1) included in the constrained convex optimization problem 152 can be expressed as minimizing an objective function that includes, without limitation, a loss function and a regularization term subject to the self-similarity prevention constraint. To render the constrained convex optimization problem 152 amenable to a closed-form solution, the loss function is defined as the square loss between the input interaction matrix 260 and the predicted score matrix. In alternate embodiments, the convex objective may include any type of objective function, any type of regularization, any type of loss function, and any number and type of constraints. In such embodiments, the techniques described herein are modified accordingly.

To efficiently generate the weight matrix 160, the closed-form solver 154 uses the method of Lagrange multipliers to reformulate the constrained convex optimization problem 152 as an unconstrained optimization problem. More precisely, the closed-form solver 154 incorporates the self-similarity prevention constraint into the objective function to generate a Lagrangian that includes, without limitation, a vector of N Lagrangian multipliers. To solve the unconstrained optimization problem, the closed-form solver 154 estimates the weight matrix 160 using a closed-form solution (not shown in FIG. 1) that minimizes the Lagrangian. In this fashion, the closed-form solver 154 estimates the weight matrix 160 that solves the constrained convex optimization problem 152 using a single linear regression that is usually significantly less time consuming that the iterative approach typically used to train recommender deep neural networks.

For explanatory purposes only, the training application 150 (including the closed-form solver 154) is described as if the training application 150 derives and then uses the closed-form solution. However, in operation, the training application 150 does not perform any derivation operations. Instead, the closed-form solver 154 implements an estimation algorithm (not shown in FIG. 1) that uses the closed-form solution to estimate the weight matrix 160 based on the Gram matrix 140.

Figure 3:
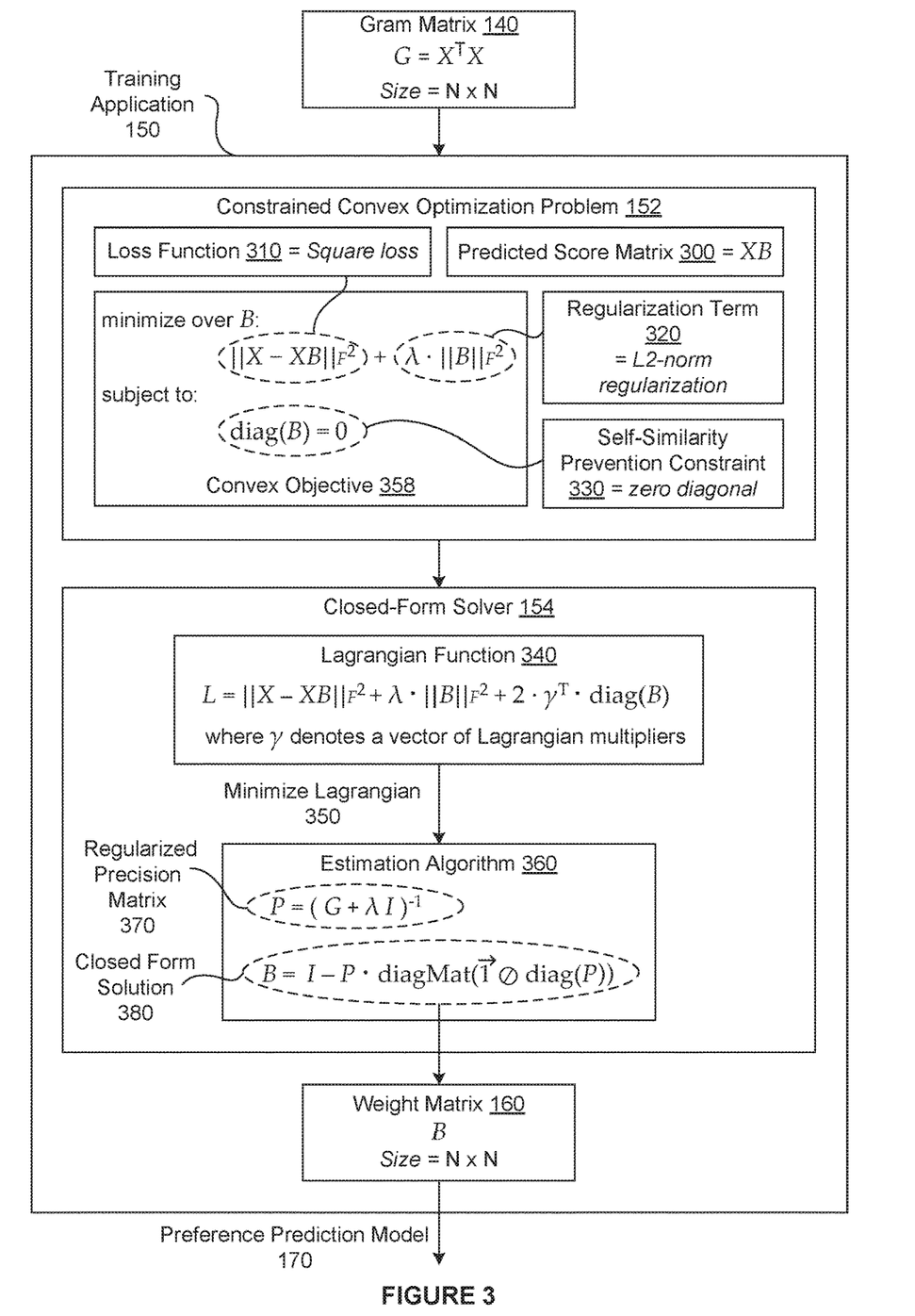
FIG. 3 is a more detailed illustration of the training application of FIG. 1, according to various embodiments.

Advantageously, and as described in greater detail in conjunction with FIG. 3, the only variable in the estimation algorithm is the Gram matrix 140. As a result, to train the preference prediction model 170, the training application 150 requires the Gram matrix 140 but not the typically larger interaction matrix 126. Furthermore, the time required to execute the estimation algorithm and, consequently, the time required to train the preference prediction model 170 depends only on the size of the item set 124 and is independent of both the size of the user set 122 and the number of user-item interactions represented in the interaction matrix 126.

After the closed-form solver 154 generates the weight matrix 160, the training application 150 generates the preference prediction model 170. The training application 150 may generate the preference prediction model 170 in any technically feasible fashion. The training application 150 is described in greater detail in conjunction with FIG. 3.

As shown, the preference prediction model 170 resides in the memory 116(3) of the compute instance 110(3) and executes on the processor 112(3) of the compute instance 110(3). As also shown, the preference prediction model 170 includes, without limitation, the weight matrix 160 and a scoring engine 172. The scoring engine 172 implements, without limitation, the equations (2a)-(2c) to compute predicted scores based on the weight matrix 160 and at least a portion of the interaction matrix 126. For explanatory purposes only, FIG. 1 depicts a scenario in which preference prediction model 170 uses equation (2b) $S(u,*)=X(u,*) \cdot B$ to compute the predicted score vector 184 $S(u,*)$ based on the $u^{th}$ row of the interaction matrix 120 $X(u,*)$. In alternate embodiments, the preference prediction model 170 may compute predicted scores based on the weight matrix 160 and relevant portions of the interaction matrix 126 in any technically feasible fashion.

Advantageously, the preference prediction model 170 is a linear regression model that computes the score $S(u,j)$ based on a linear combination of the N weights included in the $j^{th}$ column of the weight matrix 170, where N is the number of items included in the item set 124. Various standard approaches exist for understanding the learned parameters in linear regression models. Consequently, understanding what the preference prediction model 170 has learned during training is easier than understanding what a typical deep neural network has learned during training.

Subsequently, a service application 180 uses the preference prediction model 170 to generate recommendations of items for users and then displays the recommendations to the users. Recommendations of items for users are also referred to herein as "user recommendations." The service application 180 resides in the memory 116(4) of the compute instance 110(4) and executes on the processor 112(4) of the compute instance 110(4). As shown, the service application 180 includes, without limitation, the user vector 182, the predicted score vector 184, a ranking engine 186, and an application interface 190.

In operation, the service application 180 receives a request from a user included in the user set 122 for services related to the item set 124. The service application 180 generates the application interface 190 that includes, without limitation, any number and type of interface elements 192. Each interface element 192 is individually selectable when the application interface 190 is displayed and is associated with a different item included in item set 124. Note that the total number of the interface elements 192 included in the application interface 190 is often far fewer than the total number of items included in the item set 124. Each interface element 192 may be associated with an item in any manner and in any technically feasible fashion. For instance, in some embodiments, each item included in the item set 124 is a media item, and a thumbnail representing a different media item is displayed via each of the interface elements 192. In various embodiments, each item included in the item set 124 is a selectable item that is available for purchase, and a representation of a different selectable item is displayed via each of the interface elements 192.

In response to the request, the service application 180 sets the user vector 182 equal to the row in the interaction matrix 126 that corresponds to the user associated with the request. Thus, the size of the user vector 182 is N. The service application 180 may determine the proper row in the interaction matrix 126 in any technically feasible fashion. Subsequently, the service application 180 inputs the user vector 182 into the preference prediction model 170. In response, the scoring engine 172 computes the predicted score vector 184 based on the weight matrix 160 and the user vector 182. The preference prediction model 170 outputs the predicted score vector 184 to the service application 180. The ranking engine 186 ranks the items in the item set 124 based on the associated predicted scores included in the predicted score vector 184 to generate a recommended item list (not shown) that includes, without limitation, N items ordered from highest predicted score to lowest predicted score.

The service application 180 filters the recommended item list to remove any items with which the user specified in the request has interacted (as per the interaction matrix 126). The service application 180 removes the lowest-ranked recommendation items from the filtered recommended item list to reduce the size of the recommended item list to equal the amount of the interface elements 192. The service application 180 then assigns each item in the filtered recommended item list to a different interface element 192 as per the ranking of the item. The service application 180 may assign the items in the filtered recommended item list to the interface elements 192 in any technically feasible fashion, For instance, in some embodiments, the service application 180 assigns the highest ranked item to the interface element 192 that is at the most prominent location in the application interface 190

The service application 180 then causes the application interface 190 to be displayed to the user associated with the request. The service application 180 may cause the application interface 190 to be displayed to the user in any technically feasible fashion. For instance, in some embodiments, the compute instance 110(4) is a server machine and the service application 180 transmits the application interface 190 to an application executing on a compute instance 110(5) (not shown) that is local to the user for display purposes. In some embodiments, the compute instance 110 (4) is local to the user and the service application 180 displays the application interface 190 via a local display device. In alternate embodiments, the service application 180 may generate any number of application interfaces 190, where each application interface 190 may be customized to a different user.

In alternate embodiments, the system 100 may include, in addition to or instead of the service application 180, any number and type of software applications that communicate with and use the preference prediction model 170 in any technically feasible fashion. Each of the software applications may use the preference prediction model 170 to make user recommendations or as part of performing any number and type of other activities for which predicted preferences of users for items are relevant.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

For instance, in alternate embodiments, the Gram matrix 140 is not defined via equation (1) (i.e., as $X^TX$) and the pre-training application 130 may transform the interaction matrix 126 into any type of Gram matrix 140 using any definition (e.g., equation) for the Gram matrix 140. For instance, in some embodiments, the interaction matrix 126 is a binary matrix and the pre-training application 130 transforms the interaction matrix 126 into the Gram matrix 140 based on a definition of a co-occurrence matrix. In other embodiments, the pre-training application 130 pre-processes each column of the interaction matrix 126 to have zero mean and then transforms the pre-processed interaction matrix 126 to the Gram matrix 140 based on the definition of a covariance matrix. In yet other embodiments, the pre-training application 130 pre-processes each column of the interaction matrix 126 to have zero mean and unit variance and then transforms the pre-processed interaction matrix 126 to the Gram matrix 140 based on the definition of the correlation matrix.

Irrespective of the definition of the Gram matrix 140, the closed-form solver 154 executes an estimation algorithm to estimate the weight matrix 160 using a closed-form solution. If the Gram matrix 140 is not defined via equation (1), then the preference prediction model 170 or the service application 180 may perform post-processing operations to transform the predicted score vector 184 back to the original space as defined by the interaction matrix 126.

For instance, in some alternate embodiments, the pre-training application 130 maps the items included in the item set 124 to tags and then generates a tag-tag Gram matrix 140 instead of the item-item Gram matrix 140. The training application 130 then generates the weight matrix 160 and the preference prediction model 170 based on the tag-tag Gram matrix 140. Subsequently, the preference prediction model 170 generates the predicted score vector 184 that includes a different predicted score for each tag. The service application 180 maps the highest-scoring tags to the corresponding items included in the item set 124 to generate the recommended item list.

It will be appreciated that the system shown herein is illustrative and that variations and modifications are possible. The connection topology, including the location, and arrangement of the interaction data 120, the pre-training application 130, the Gram matrix 140, the training application 150, the weight matrix 160, the preference prediction model 170, the number and type of service applications 180, and the number and type of compute instances 110 may be modified as desired. In certain embodiments, one or more components shown in FIG. 1 may not be present.

In particular, the pre-training application 130, the training application 150, the preference prediction model 170, and the service application 180 may be implemented across any number (including one) of software applications that reside and execute on any number (including one) of compute instances 110 in any combination. For instance, alternate embodiments, the pre-training application 130 is subsumed by the training application 150.

Figure 2:
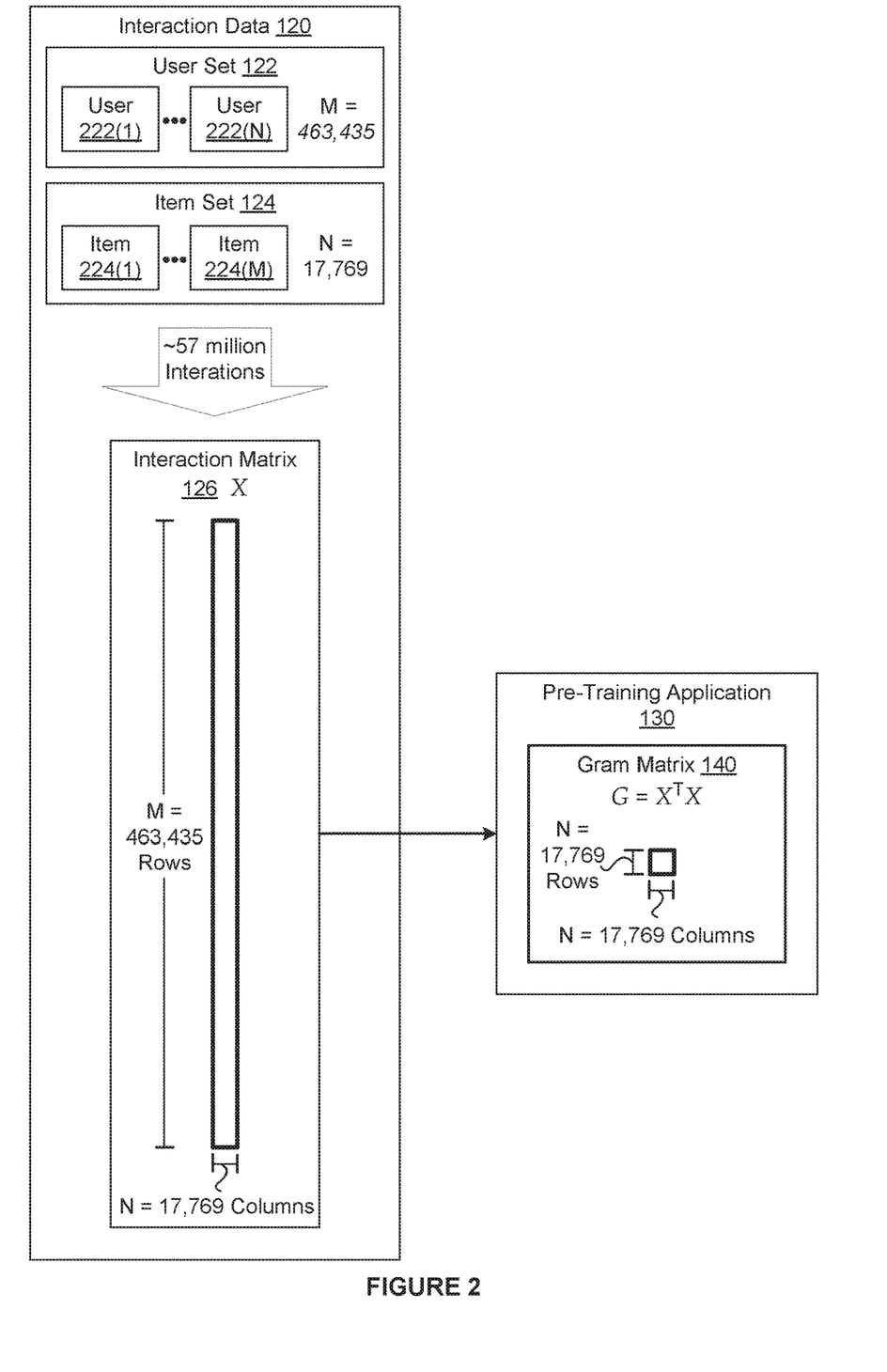
FIG. 2 sets forth exemplary illustrations of the interaction data and the Gram matrix of FIG. 1, according to various embodiments.

FIG. 2 sets forth exemplary illustrations of the interaction data 120 and the Gram matrix 140 of FIG. 1, according to various embodiments. As shown, the interaction data 120 includes, without limitation, a user set 122 that includes users 222(1)-222(M), an item set 124 that includes items 224(1)-224(N), and an interaction matrix 126. Each of the users 222 and each of the items 224 may be identified in any technically feasible fashion. For instance, in some embodiments, each of the users 222 is assigned an integer user identifier and each of the items 224 is assigned an integer item identifier. As described previously herein, the interaction matrix 126 has a different row for each of the users 222 included in the user set 122 and a different column for each of the items 224 included in the item set 124. Consequently, the interaction matrix 126 is a user-item matrix that has the dimensions of M by N and includes, without limitation, M×N entries.

For explanatory purposes only, the number of users 222 included in the user set 122 is 463,435, the number of items 224 included in the item set 124 is 17,769, and the interaction matrix 126 represents approximately five million interactions between the users 222 and the items 224. Accordingly, the dimensions of the interaction matrix 126 are 463,435 by 17,769 and the interaction matrix 126 therefore includes, without limitation, 8,234,776,515 entries.

To generate the Gram matrix 140, the pre-training application 130 pre-multiplies the interaction matrix 126 by the transpose of the interaction matrix 126 as per equation (1). As shown, the dimensions of the Gram matrix 140 are 17,769 by 17,769 and the Gram matrix 140 therefore includes, without limitation, 315,737,361 entries. As described in greater detail in conjunction with FIG. 3, the Gram matrix 140 is the only variable in the estimation algorithm used to compute the weight matrix 160. Therefore the time required to train the preference prediction model 170 depends only on the size of the item set 134 (17,769) and is independent of both the size of the user set 132 (463,435) and the number of user-item interactions (approximately five million) represented in the interaction matrix 126.

Closed-Form Solution for Weight Matrix

FIG. 3 is a more detailed illustration of the training application 150 of FIG. 1, according to various embodiments. The input to the training application 150 is the Gram matrix 140 and the output of the training application 150 is the preference prediction model 170 that includes the weight matrix 160. As shown, the training application 150 includes, without limitation, the constrained convex optimization problem 152, the closed-form solver 154, and the weight matrix 160.

The training application 150 trains the preference prediction model 170 based on a goal of reproducing the input as the output, where the input is the interaction matrix 126 and the output is a predicted score matrix 300 that is denoted as S. As per the preference prediction model 170, the predicted score matrix is equal to the interaction matrix 126 post-multiplied by the weight matrix 160. Importantly, to ensure that the training application 150 trains the preference prediction model 170 to generalize, the training application 150 does not allow the weight matrix 160 to be the identity matrix.

The goal of the training application 150 can be expressed as solving the constrained convex optimization problem 152 for learning the weights of the weight matrix 160. As shown, the constrained context optimization problem 152 includes, without limitation, the predicted score matrix 300, a loss function 310, a regularization term 320, a self-similarity prevention constraint 330, and a convex objective 358. The loss function 310 is the square loss between the interaction matrix 126 and the predicted score matrix 300 and can be expressed as $\|X-XB\|F^2$. The symbol $\|\cdot\|F^2$ denotes the Frobenius norm. Advantageously, using the loss function 310 of the square loss allows for a closed-form solution to the constrained convex optimization problem 152 as described below. In alternate embodiments, the loss function 310 may be any loss function that allows for a closed-form solution to the constrained context optimization problem 152.

To avoid overfitting the preference prediction model 170, the training application uses L2-norm regularization of the weights to be learned. The regularization term 320 represents the L2-norm regularization and is associated with a single regularization hyperparameter. The value of the regularization hyperparameter (e.g., 500) may be determined in any technically feasible fashion. For instance, in some embodiments, the value of the regularization hyperparameter is optimized on a validation set. As shown, the regularization term 320 can be expressed as the term $\lambda \cdot \|B\|F^2$. In alternate embodiments, the constrained convex optimization problem 152 may include any number and type of regularization terms 320 that are associated with any number of regularization hyperparameters. For instance, in some alternate embodiments, the constrained convex optimization problem 152 includes a second regularization term that represents the L1-norm regularization of the weights to be learned and is associated with a second regularization hyperparameter.

The self-similarity prevention constraint 330 constrains the diagonal elements of the weight matrix 160 to zero. The diagonal elements of the weight matrix 160 are also referred to herein as the "diagonal weights" and the remaining elements are also referred to herein as the "off-diagonal weights." The diagonal weights are denoted as B(j,j), where j=1 to N. The self-similarity prevention constraint 330 ensures that the weight matrix 160 is not the identity matrix where each item 224(j) recommends itself. The self-similarity prevention constraint 330 also ensures that interaction matrix 260 entry X(u,j) is not used to compute the predicted score matrix 300 entry S(u,j) Notably, the self-similarity prevention constraint 330 is the only constraint on the weights of the weight matrix 160 and, consequently, any number of the off-diagonal weights in the weight matrix 160 may be positive (or zero) and the remaining off-diagonal weights may be negative. In alternate embodiments, the constrained convex optimization problem 152 may include any number and type of constraints and the techniques described herein are modified accordingly.

As shown, the convex objective 358 of the training application 150 is to minimize, over the weight matrix 160, the sum of the loss function 310 and the regularization term 320 subject to the self-similarity prevention constraint 330. Accordingly, the convex objective 358 corresponds to an objective function and a constraint that can be expressed, respectively, as the following equations (3a) and (3b):

$$\text{minimize over } B: \|X-XB\|F^2+\lambda \cdot \|B\|F^2 \tag{3a}$$

$$\text{subject to: } \operatorname{diag}(B)=0 \tag{3b}$$

As used herein, diag(B) denotes the diagonal of the weight matrix 160.

To decrease the training time, the closed-form solver 154 solves the constrained convex optimization problem 152 for learning the weight matrix 160 in closed-form. As shown, the closed-form solver 154 includes, without limitation, a Lagrangian function 140 and an estimation algorithm 360. The closed-form solver 154 uses the method of Lagrange multipliers to reformulate the constrained convex optimization problem 152 as an unconstrained optimization problem. More precisely, the closed-form solver 154 incorporates the constraint expressed as the equation (3b) into the objective function expressed as the equation (3a) to generate the Lagrangian function 140. The closed-form solver 154 then executes a Lagrangian minimization 350 that minimizes the Lagrangian 140.

As shown, the Lagrangian function 140 is denoted as L and can be expressed as the following equation (4):

$$L=\|X-XB\|F^2+\lambda \cdot \|B\|F^2+2\cdot \gamma^T \cdot \operatorname{diag}(B) \tag{4}$$

As used herein, γ denotes a vector of Lagrangian multipliers $(\gamma(1), \ldots, \gamma(N))^T$, where N is the number of items in the item set 124.

The closed-form solver 154 selects the values for the vector of Lagrangian multipliers such that the constraint in the equation (3b) is satisfied. To select the values for the vector of Lagrangian multipliers, the closed-form solver 154 sets the derivative of the Lagrangian 140 equal to zero. After re-arranging the terms of the derivative of the Lagrangian 140, the closed-form solver 154 obtains an estimate for the weight matrix 160 that can be expressed as the following equation (5):

$$\hat{B}=(X^TX+\lambda I)^{-1}\cdot (X^TX-\operatorname{diagMat}(\gamma)) \tag{5}$$

As used herein, B denotes the weight matrix 160, $\hat{B}$ denotes an estimate for the weight matrix 160, diagMat(γ) denotes a diagonal matrix corresponding to the vector of Lagrangian multipliers, and I denotes the identity matrix.

The closed-form solver 154 then defines (for sufficiently large λ, such as five hundred) an estimate for a regularized precision matrix 370 as per the following equation (6):

$$\hat{P} \triangleq (X^TX+\lambda I)^{-1} \tag{6}$$

As used herein, $\hat{P}$ denotes the estimate for the regularized precision matrix 370 (denoted as P).

The closed-form solver 154 substitutes the equation (6) into the equation (5) to derive, successively, the following equations (7a), (7b), and (7c) that each expresses the estimate of the weight matrix 160:

$$\hat{B}=\hat{P}\cdot (\hat{P}^{-1}-\lambda I-\operatorname{diagMat}(\gamma)) \tag{7a}$$

$$\hat{B}=I-\hat{P}\cdot (\lambda I+\operatorname{diagMat}(\gamma)) \tag{7b}$$

$$\hat{B}=I-\hat{P}\cdot \operatorname{diagMat}(\hat{\gamma}) \tag{7c}$$

As used herein, the vector $\hat{\gamma}$ is defined as $\lambda \vec{1}+\gamma$, where $\vec{1}$ denotes a vector of ones. The values of the Lagrangian multipliers in the vector of Lagrangian multipliers γ and therefore the values in the vector $\hat{\gamma}$ are determined by the constraint diag($\hat{B}$)=0. Based on the equation (7c), the closed-form solver 154 expresses the constraint diag($\hat{B}$)=0 as the following equation (8):

$$0=\operatorname{diag}(\hat{B})=\vec{1}-\operatorname{diag}(\hat{P})\odot \hat{\gamma} \tag{8}$$

As used herein, the symbol ⊙ denotes the elementwise product. Based on the equation (8), the closed-form solver 154 expresses the vector $\hat{\gamma}$ as the following equation (9):

$$\hat{\gamma}=\vec{1} \oslash \operatorname{diag}(\hat{P}) \tag{9}$$

As used herein, the symbol ⊘ denotes the elementwise division. Note that because the regularized precision matrix 370 is invertible, the elementwise division in the equation (9) is well-defined.

The closed-form solver 154 substitutes the equation (9) into the equation (7c) to generate a closed-form solution 380 for the constrained convex optimization problem 152 for learning the weight matrix 160. The closed-form solution 380 can be expressed as the following equation (10):

$$\hat{B} = I - \hat{P} \cdot \text{diagMat}(\vec{1} \oslash \text{diag}(\hat{P}))  \quad (10)$$

Accordingly, the weights in the estimate of the weight matrix 160 can be expressed as the following equation (11):

$$\hat{B}(i,j) = \begin{cases} 0 & \text{if } i \text{ is equal to } j \\ -\dfrac{\hat{P}(i,j)}{\hat{P}(j,j)} & \text{otherwise} \end{cases} \quad (11)$$

As per equation 11, the diagonal weights are equal to zero and the off-diagonal weights are determined by the estimate of the regularized precision matrix 370. More precisely, the estimated off-diagonal weights for the $j^{th}$ column of the weight matrix 160 are determined by the estimated off-diagonal elements in the $j^{th}$ column of the regularized precision matrix 370 divided by the estimated value of the diagonal element in the $j^{th}$ column of the regularized precision matrix 370.

For explanatory purposes only, the equations (3)-(11) are described as if the equations (3)-(11) are derived and implemented by the training application 150 and the closed-form solver 154. However, in operation, neither the training application 150 nor the closed-form solver 154 derives any equations. Instead, the closed-form solver 154 executes the estimation algorithm 360 to estimate the regularized precision matrix 370 based on the Gram matrix 140 and then estimate the weight matrix 160 based on the regularized precision matrix 370.

More precisely, the closed-form solver 154 sets the regularized precision matrix 370 equal to the estimate of the regularized precision matrix 370 defined in the equation (6) with the Gram matrix 140 substituted in for the term $X^T X$. The closed-form solver 154 then sets the weight matrix 160 equal to the estimate of the weight matrix 160 defined in the equation (10). Consequently and as shown, the estimation algorithm 360 that the closed-form solver 154 executes can be expressed as the following equations (12a) and (12b):

$$P = (G + \lambda I)^{-1} \quad (12a)$$

$$B = I - P \cdot \text{diagMat}(\vec{1} \oslash \text{diag}(P)) \quad (12b)$$

The closed-form solver 154 may execute the estimation algorithm 360 in any technically feasible fashion. In general, the amount of time required to execute the estimation algorithm 360 and, consequently, the amount of time required to train the preference prediction model 170 depends only on the number of items 224 and is independent of both the number of users 222 and the number of user-item interactions.

As persons skilled in the art will recognize, the most computationally-intensive portion of the estimation algorithm 360 is the matrix inversion associated with the computation of the regularized precision matrix 370. In some embodiments, the closed-form solver 154 uses the Coppersmith-Winograd algorithm to perform the matrix inversion and therefore the computational complexity of the matrix inversion is approximately $O(N^{2.376})$, where N is the number of items 224 in the item set 124. In the same or other embodiments, the closed-form solver 154 avoids explicitly instantiating the diagonal matrix in the equations (12a) and (12b) to further reduce the training time.

After the closed-form solver 154 generates the weight matrix 160, the training application 150 generates the preference prediction model 170 that uses the weight matrix 160. The training application 150 may generate the preference prediction model 170 in any technically feasible fashion. For instance, in some embodiments, the training application 150 generates the entire preference prediction model 170 (including the weight matrix 160 and the scoring engine 172). In other embodiments, the training application 150 transmits the weight matrix 160 to an untrained preference prediction model 170, thereby training the preference prediction model 170. In yet other embodiments, the training application 150 transmits the weight matrix 160 to a location (e.g., accessible via the Internet) from which the preference prediction model 170 acquires the most recently generated weight matrix 160.

As described previously herein, in response to receiving the input of the user vector 182, the preference prediction model 170 performs a vector-matrix multiplication between the user vector 182 and the weight matrix 160 to compute the predicted score vector 184 for the user 222 associated with the user vector 182. The preference prediction model 170 then outputs the predicted score vector 184. In alternate embodiments, the preference prediction model 170 may generate predicted scores at any level of granularity (e.g., a single predicted score for a specific user 212, a predicted score matrix for the entire interaction matrix 126) based on the associated portion of the interaction matrix 126.

Advantageously, the closed-form solver 154 efficiently computes an precise optimum for the weight matrix 160 using the closed-form solution 380. By constraint, the gradient descent iterative techniques typically used to training a recommender deep neural network may converge slowly or get "stuck" at a local optimum of the training objective for the recommender deep neural network. Accordingly, the amount of time and/or the amount of processing resources required to train the preference prediction model 170 can be substantially lower than, respectively, the amount of time and/or the amount of processing resources required to train a comparable recommender deep neural network. For example, empirical results have shown that the interaction data 120 described previously herein in conjunction with FIG. 2 was used to compare the performance of the preference prediction model 170 and a Variational Autoencoder (a deep neural network with three hidden layers) using comparable processors. The training time for the preference prediction model 170 was one minute and thirty-four seconds and the training time for the Variational Autoencoder was one hour and twenty-six minutes (more than fifty-four times longer).

Furthermore, the number of inputs to the preference prediction model 170 is equal to the number of outputs from the preference prediction model 170. By contrast, in many recommender deep neural networks, while the input and output layers may have many neurons (e.g., N, where N is the number of the items 224), each of the hidden layers typically have less neurons. As a result, the overall shape of many recommender deep neural networks is an hourglass and some information that could otherwise be conveyed from the input layer to the output layer is lost at the neck of the neural network. This types of information loss can reduce the accuracy of the recommender deep neural network. In contrast, the preference prediction model 170 learns a full set of weights (N by N). As a result, the accuracy of the preference prediction model 170 may be improved relative to a typical recommender deep neural networks. Empirical results have also shown that the accuracy of the preference prediction model 170 is comparable or better than the accuracy of a typical recommender deep neural network. In particular, empirical results have shown that the accuracy of the preference prediction model 170 can be more than 20% higher than the accuracy of the Variational Autoencoder when the number of the items 224 is relatively high.

Figure 4:
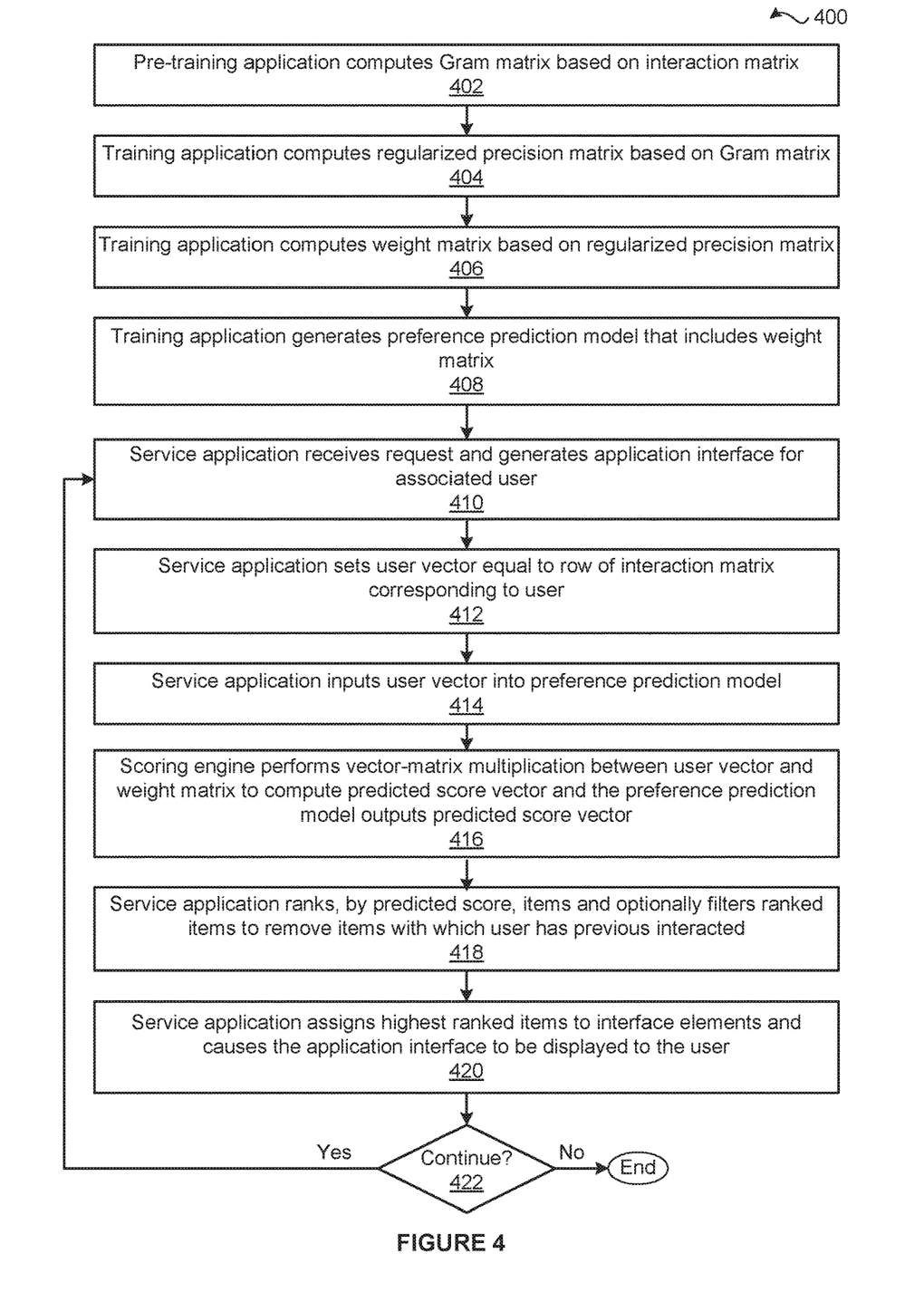
FIG. 4 is a flow diagram of method steps for generating user recommendations, according to various embodiments.

FIG. 4 is a flow diagram of method steps for generating user recommendations, according to various embodiments. Although the method steps are described with reference to the systems of FIGS. 1-3, persons skilled in the art will understand that any system configured to implement the method steps, in any order, falls within the scope of the embodiments.

As shown, a method 400 begins at step 402, where the pre-training application 130 computes the Gram matrix 140 based on the interaction matrix 126. At step 404, the training application 150 computes the regularized precision matrix 370 based on the Gram matrix 140. At step 406, the training application 150 computes the weight matrix 160 based on the regularized precision matrix 370. At step 408, the training application 150 generates the preference prediction model 170 that includes the weight matrix 160.

At step 410, the service application 180 receives a request from one of the users 122 included in the user set 122 and generates the application interface 190. At step 412, the service application 180 sets the user vector 182 equal to the row of the interaction matrix 126 that is associated with the user 222. At step 414, the service application 180 inputs the user vector 182 into the preference prediction model 170.

At step 416, the scoring engine 172 performs a vector-matrix multiplication between the user vector 182 and the weight matrix 160 to compute the predicted score vector 184 for the user 222. The preference prediction model 170 then outputs the predicted score vector 184. At step 418, the service application 180 ranks, by predicted score, the items 224 in the item set 124 and optionally filters the ranked items 124 to remove the items 224 with which the user 122 has interacted to generate the recommended item list. At step 420, the service application 180 assigns the highest ranked items 124 as per the recommended item list to the interface elements 192 and causes the application interface 190 to be displayed to the user.

At step 422, the service application 180 determines whether to continue processing new requests. If, at step 422, the service application 180 determines to continue processing new requests, then the method 400 returns to step 410, where the service application 180 receives a new request and generates a new application interface 190. The service application 180 and the preference prediction model 170 continue to cycle through steps 410-422 until the service application 180 determines, at step 422, not to continue processing new requests. If, however, at step 422, the service application 180 determines not to continue processing new requests, then the method 400 terminates.

In sum, the disclosed techniques may be used to efficiently and accurately predict preferences of users for items. In one embodiment, a pre-training application generates an item-item Gram matrix based on a user-item interaction matrix that represents the historical preferences of users for items. The Gram matrix has the dimensions of N by N and the interaction matrix has the dimensions of M by N, where N is the number of items and M is the number of users represented in the interaction matrix. Using the Gram matrix, the training application trains a preference prediction model to reproduce an input (the interaction matrix) as the output (a predicted score matrix).

The preference prediction model is a linear model that is parameterized via a weight matrix that has the dimensions of N by N and includes $N^2$ weights. Training the linear preference prediction model can be expressed as the constrained convex optimization problem of learning the weight matrix that minimizes an objective function subject to a self-similarity prevention constraint. The objective function includes, without limitation, a square loss function that measures the error of the preference prediction model and an L2-norm regularization term that reduces the likelihood of overfitting the preference prediction model. The self-similarity prevention constraint ensures that the preference prediction model does not learn the trivial solution of a weight matrix that is equal to the identity matrix (self-similarity of items) by constraining the diagonal elements of the weight matrix to be zero, Using the method of Lagrange multipliers, the constrained convex optimization problem can be reformulated as an unconstrained convex optimization problem. More precisely, the self-similarity prevention constraint can be incorporated into the objective function to generate a Lagrangian that includes a vector of N Lagrangian multipliers. The constrained convex optimization problem can then be solved using a closed-form solution that minimizes the Lagrangian and has a single variable—the Gram matrix.

In operation, upon receiving the Gram matrix from the pre-training application, the training application computes the weight matrix based on the closed-form solution and the Gram matrix. The training application then generates the preference prediction model that includes the weight matrix. To compute the predicted score for a user u and an item j, the preference prediction model computes the dot product between the $u^{th}$ row of the interaction matrix and the $i^{th}$ column of the weight matrix. The preference prediction model may compute and output predicted preferences at any level of granularity based on the weight matrix and at least a portion of the interaction matrix. For instance, in some embodiments, the input to the preference prediction model is a row of the interaction matrix and the output of the preference prediction model is a predicted score vector. The predicted score vector includes, without limitation, N predicted scores, where each predicted score represents a preference of the user associated with the inputted row for a different item included in the item set. Any number of software applications can use the trained preference prediction model to accurately generate predicted scores of users for items for any number of purposes.

For instance, in some embodiments, a service application receives a request associated with the item set from a user included in the user set. The service application inputs the row of the interaction matrix that corresponds to the user into the preference prediction model. The preference prediction model outputs predicted preferences for the user for the items in the item set. The service application ranks the items with which the user has not previously interacted based on the predicted preferences. The service application then displays representations of the highest ranked items to the user via an application interface.

At least one technical advantage of the disclosed techniques relative to the prior art is that the training application can more efficiently train models that accurately predict the preferences of users. In particular, since the training application computes the weight matrix non-iteratively using a computationally-efficient closed-form solution, the time and processing resources required for training can be reduced relative to the iterative processes typically employed when training deep neural networks. Another advantage of the disclosed techniques is that the preference prediction model is a linear regression model and various standard approaches exist for understanding what linear regression models learned during training. Yet another advantage of the disclosed techniques is that the preference prediction model learns a full set of weights; whereas, in prior art approaches involving neural networks, some weight-related information can be lost, leading to potential inaccuracies in the predictions generated by the neural networks. These technical advantages provide one or more technological advancements over the prior art.

1. In some embodiments, a method comprises generating a preference prediction model based on a first matrix and a closed-form solution for minimizing a Lagrangian, wherein the first matrix is associated with an interaction matrix that reflects a plurality of interactions between a plurality of users and a plurality of items, and wherein the Lagrangian is formed based on a constrained optimization problem associated with the interaction matrix; generating a first application interface that is to be presented to a first user included in the plurality of users, wherein the first application interface includes a plurality of interface elements, and each interface element is individually selectable when the first application interface is displayed and is associated with a different item included in the plurality of items; computing one or more predicted scores using the preference prediction model, wherein each predicted score predicts a preference of the first user for a different item included in the plurality of items; determining a first item from the plurality of items to present to the first user via a first interface element included within the first application interface based on the one or more predicted scores; and causing a representation of the first item to be displayed via the first interface element included in the first application interface.

2. The method of clause 1, wherein determining the first item from the plurality of items comprises ranking the items that are associated with the one or more predicted scores based on the one or more predicted scores to generate a ranked item list; and determining that the first item is the highest-ranked item included in the ranked item list with which the first user has not interacted.

3. The method of clauses 1 or 2, wherein each item included in the plurality of items comprises a media item, and a first interaction included in the plurality of interactions comprises a rating that the first user assigned to a second item included in the plurality of items via a second application interface.

4. The method of any of clauses 1-3, wherein each item included in the plurality of items comprises a selectable item, and a first interaction included in the plurality of interactions comprises a purchase that a second user included in the plurality of users made of the first item via a second application interface.

5. The method of any of clauses 1-4, wherein the preference prediction model comprises a linear regression model that includes a weight matrix, and generating the preference prediction model comprises computing the weight matrix using the closed-form solution and the first matrix.

6. The method of any of clauses 1-5, wherein the preference prediction model comprises a linear regression model that includes a weight matrix having at least one negative weight.

7. The method of any of clauses 1-6, wherein the preference prediction model comprises a linear regression model that includes a square weight matrix having an order that is equal to the number of items included in the plurality of items, and wherein each of the diagonal elements of the square weight matrix is equal to zero.

8. The method of any of clauses 1-7, wherein the preference prediction model includes a weight matrix, and wherein computing the one or more predicted scores comprises performing a vector-vector multiplication operation between a row of the interaction matrix associated with the first user and a column of the weight matrix associated with the first item.

9. The method of any of clauses 1-8, wherein the constrained optimization problem comprises a convex objective that includes a square loss function computed using a Frobenius norm.

10. The method of any of clauses 1-9, wherein the first matrix comprises a Gram matrix, and further comprising pre-multiplying the interaction matrix by the transpose of the interaction matrix to compute the first matrix.

11. In some embodiments, one or more non-transitory computer readable media include instructions that, when executed by one or more processors, cause the one or more processors to perform the steps of generating a preference prediction model based on a first matrix and a closed-form solution for optimizing a Lagrangian, wherein the first matrix is associated with an interaction matrix that reflects a plurality of interactions between a plurality of users and a plurality of items, and wherein the Lagrangian is formed based on a constrained optimization problem associated with the interaction matrix; generating a first application interface that is to be presented to a first user included in the plurality of users, wherein the first application interface includes a plurality of interface elements, and each interface element is individually selectable when the first application interface is displayed and is associated with a different item included in the plurality of items; computing one or more predicted scores using the preference prediction model, wherein each predicted score predicts a preference of the first user for a different item included in the plurality of items; performing one or more ranking operations on the plurality of items based on the one or more predicted scores to determine a first item from the plurality of items to present to the first user via a first interface element included within the first application interface; and causing a representation of the first item to be displayed via the first interface element included in the first application interface.

12. The one or more non-transitory computer readable media of clause 11, wherein performing the one or more ranking operations comprises ranking the items that are associated with the one or more predicted scores based on the one or more predicted scores to generate a ranked item list; and determining that the first item is the highest-ranked item included in the ranked item list with which the first user has not interacted.

13. The one or more non-transitory computer readable media of clauses 11 or 12, wherein each item included in the plurality of items comprises a media item, and a first interaction included in the plurality of interactions comprises a rating that the first user assigned to a second item included in the plurality of items via a second application interface.

14. The one or more non-transitory computer readable media of any of clauses 11-13, wherein each item included in the plurality of items comprises a selectable item, and a first interaction included in the plurality of interactions comprises a purchase that a second user included in the plurality of users made of the first item via a second application interface.

15. The one or more non-transitory computer readable media of any of clauses 11-14, wherein the preference prediction model includes a square weight matrix that, as a solution to the constrained optimization problem, optimizes the preference prediction model with respect to the inference matrix subject to the constraint that each of the diagonal elements of the square weight matrix is equal to zero.

16. The one or more non-transitory computer readable media of any of clauses 11-15, wherein computing the one or more predicted scores comprises inputting a row of the interaction matrix that corresponds to the first user into the preference prediction model.

17. The one or more non-transitory computer readable media of any of clauses 11-16, wherein the preference prediction model includes a weight matrix, and wherein computing the one or more predicted score comprises performing a vector-matrix multiplication operation between a row of the interaction matrix associated with the first user and the weight matrix.

18. The one or more non-transitory computer readable media of any of clauses 11-17, wherein the constrained optimization problem comprises a convex objective that includes an L2-norm regularization term.

19. The one or more non-transitory computer readable media of any of clauses 11-18, further comprising performing one or more preprocessing operations on the interaction matrix to generate a preprocessed matrix; and pre-multipying the preprocessed matrix by the transpose of the preprocessed matrix to generate the first matrix.

20. In some embodiments, a system comprises one or more memories storing instructions; and one or more processors that are coupled to the one or more memories and, when executing the instructions, are configured to generate a preference prediction model based on an interaction matrix and a closed-form solution for minimizing a Lagrangian, wherein the interaction matrix reflects a plurality of interactions between a plurality of users and a plurality of items, and wherein the Lagrangian is formed based on a constrained optimization problem associated with the interaction matrix; generate a first application interface that is to be presented to a first user included in the plurality of users, wherein the first application interface includes a plurality of interface elements, and each interface element is individually selectable when the first application interface is displayed and is associated with a different item included in the plurality of items; compute one or more predicted scores using the preference prediction model, wherein each predicted score predicts a preference of the first user for a different item included in the plurality of items; determining a first item from the plurality of items to present to the first user via a first interface element included within the first application interface based on the one or more predicted scores; and cause a representation of the first item to be displayed via the first interface element included in the first application interface.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
generating, by at least one processor included in one or more processors, a first matrix based on an interaction matrix, wherein the interaction matrix reflects a plurality of interactions between a plurality of users and a plurality of items;
generating, by at least one processor included in the one or more processors, a weight matrix based on the first matrix and a closed-form solution that minimizes a Lagrangian, wherein the Lagrangian is formed based on a constrained convex optimization problem associated with the interaction matrix;
generating, by at least one processor included in the one or more processors, a linear preference prediction model that uses the weight matrix;
generating, by at least one processor included in the one or more processors, a first application interface that is to be presented to a first user included in the plurality of users, wherein the first application interface includes a plurality of interface elements, and each interface element is individually selectable when the first application interface is displayed and is associated with a different item included in the plurality of items;
computing, by at least one processor included in the one or more processors, one or more predicted scores using the linear preference prediction model, wherein each predicted score predicts a preference of the first user for a different item included in the plurality of items;
determining, by at least one processor included in the one or more processors, a first item from the plurality of items to present to the first user via a first interface element included within the first application interface based on the one or more predicted scores; and
causing a representation of the first item to be displayed via the first interface element included in the first application interface.

2. The method of claim 1, wherein the determining the first item from the plurality of items comprises:
ranking the items that are associated with the one or more predicted scores based on the one or more predicted scores to generate a ranked item list; and
determining that the first item is the highest-ranked item included in the ranked item list with which the first user has not interacted.

3. The method of claim 1, wherein each item included in the plurality of items comprises a media item, and a first interaction included in the plurality of interactions comprises a rating that the first user assigned to a second item included in the plurality of items via a second application interface.

4. The method of claim 1, wherein each item included in the plurality of items comprises a selectable item, and a first interaction included in the plurality of interactions comprises a purchase that a second user included in the plurality of users made of the first item via a second application interface.

5. The method of claim 1, wherein the linear preference prediction model comprises a linear regression model that includes the weight matrix.

6. The method of claim 1, wherein the weight matrix includes at least one negative weight.

7. The method of claim 1, wherein the weight matrix is a square weight matrix having an order that is equal to a number of items included in the plurality of items, and wherein each of the diagonal elements of the square weight matrix is equal to zero.

8. The method of claim 1, wherein computing the one or more predicted scores comprises performing a vector-vector multiplication operation between a row of the interaction matrix associated with the first user and a column of the weight matrix associated with the first item.

9. The method of claim 1, wherein the constrained convex optimization problem comprises a convex objective that includes a square loss function computed using a Frobenius norm.

10. The method of claim 1, wherein the first matrix comprises a Gram matrix, and further comprising pre-multiplying the interaction matrix by a transpose of the interaction matrix to compute the first matrix.

11. One or more non-transitory computer readable media including instructions that, when executed by one or more processors, cause the one or more processors to perform the steps of:
generating a first matrix based on an interaction matrix, wherein the interaction matrix reflects a plurality of interactions between a plurality of users and a plurality of items;
generating a weight matrix based on the first matrix and a closed-form solution that minimizes a Lagrangian, wherein the Lagrangian is formed based on a constrained convex optimization problem associated with the interaction matrix;
generating a linear preference prediction model that uses the weight matrix;
generating a first application interface that is to be presented to a first user included in the plurality of users, wherein the first application interface includes a plurality of interface elements, and each interface element is individually selectable when the first application interface is displayed and is associated with a different item included in the plurality of items;
computing one or more predicted scores using the linear preference prediction model, wherein each predicted score predicts a preference of the first user for a different item included in the plurality of items;
determining a first item from the plurality of items to present to the first user via a first interface element included within the first application interface based on the one or more predicted scores; and
causing a representation of the first item to be displayed via the first interface element included in the first application interface.

12. The one or more non-transitory computer readable media of claim 11, wherein determining the first item from the plurality of items comprises:
ranking the items that are associated with the one or more predicted scores based on the one or more predicted scores to generate a ranked item list; and
determining that the first item is the highest-ranked item included in the ranked item list with which the first user has not interacted.

13. The one or more non-transitory computer readable media of claim 11, wherein each item included in the plurality of items comprises a media item, and a first interaction included in the plurality of interactions comprises a rating that the first user assigned to a second item included in the plurality of items via a second application interface.

14. The one or more non-transitory computer readable media of claim 11, wherein each item included in the plurality of items comprises a selectable item, and a first interaction included in the plurality of interactions comprises a purchase that a second user included in the plurality of users made of the first item via a second application interface.

15. The one or more non-transitory computer readable media of claim 11, wherein the weight matrix is a square weight matrix that optimizes the preference prediction model with respect to the interaction matrix subject to a constraint that each of the diagonal elements of the square weight matrix is equal to zero.

16. The one or more non-transitory computer readable media of claim 11, wherein computing the one or more predicted scores comprises inputting a row of the interaction matrix that corresponds to the first user into the linear preference prediction model.

17. The one or more non-transitory computer readable media of claim 11, wherein computing the one or more predicted score comprises performing a vector-matrix multiplication operation between a row of the interaction matrix associated with the first user and the weight matrix.

18. The one or more non-transitory computer readable media of claim 11, wherein the constrained convex optimization problem comprises a convex objective that includes an L2-norm regularization term.

19. The one or more non-transitory computer readable media of claim 11, further comprising:
   performing one or more preprocessing operations on the interaction matrix to generate a preprocessed matrix; and
   pre-multiplying the preprocessed matrix by a transpose of the preprocessed matrix to generate the first matrix.

20. A system, comprising:
one or more memories storing instructions; and
one or more processors that are coupled to the one or more memories and,
   when executing the instructions, are configured to:
   generate a first matrix based on an interaction matrix, wherein the interaction matrix reflects a plurality of interactions between a plurality of users and a plurality of items;
   generate a weight matrix based on the first matrix and a closed-form solution that minimizes a Lagrangian, wherein the Lagrangian is formed based on a constrained convex optimization problem associated with the interaction matrix;
   generate a linear preference prediction model that uses the weight matrix;
   generate a first application interface that is to be presented to a first user included in the plurality of users, wherein the first application interface includes a plurality of interface elements, and each interface element is individually selectable when the first application interface is displayed and is associated with a different item included in the plurality of items;
   compute one or more predicted scores using the linear preference prediction model, wherein each predicted score predicts a preference of the first user for a different item included in the plurality of items;
   determining a first item from the plurality of items to present to the first user via a first interface element included within the first application interface based on the one or more predicted scores; and
   cause a representation of the first item to be displayed via the first interface element included in the first application interface.

* * * * *